C. BERGER.
MEASURING APPARATUS.
APPLICATION FILED OCT. 16, 1918.

1,295,842.

Patented Mar. 4, 1919.
2 SHEETS—SHEET 1.

INVENTOR:
Christian Berger,
BY
Rogers, Kennedy + Campbell,
ATTORNEYS.

C. BERGER.
MEASURING APPARATUS.
APPLICATION FILED OCT. 16, 1918.

1,295,842.

Patented Mar. 4, 1919.
2 SHEETS—SHEET 2.

INVENTOR:
Christian Berger,
BY
Rogers, Kennedy + Campbell,
ATTORNEYS.

UNITED STATES PATENT OFFICE.

CHRISTIAN BERGER, OF NEW YORK, N. Y.

MEASURING APPARATUS.

1,295,842.

Specification of Letters Patent.

Patented Mar. 4, 1919.

Application filed October 16, 1918. Serial No. 258,329.

*To all whom it may concern:*

Be it known that I, CHRISTIAN BERGER, a citizen of the United States, residing at New York city, in the county of New York and State of New York, have invented certain new and useful Improvements in Measuring Apparatus, of which the following is a specification, reference being had therein to the accompanying drawings.

This invention relates to measuring apparatus, and more particularly to apparatus for measuring the weight of articles such as merchandise; and a particular instance in which this invention possesses utility is the so-called automatic weighing machine having a relatively movable chart of tables or scales upon which the weight, or even the sales price of the commodity upon the scales is directly indicated. In one type of such machine the chart of tables or scales consists of a rotary cylinder on which the tables are impressed by printing or otherwise inscribed, this cylindrical chart being viewable by the salesman at one side and by the customer at the other side.

The general object of the present invention is to improve the efficiency and convenience of measuring apparatus, especially of the kind mentioned, and a particular object is to afford such a machine with a relatively movable chart, and which can be consulted simultaneously by two persons from different or opposite viewpoints, so as to correctly give the same reading or indication at each side and without confusion or other inconvenience. Another object is to enable the utilization of the entire surface of the chart or rotary cylinder for the purpose of indicating measurements readable to the persons at both sides, yet without confusion at either side from the presence of the numbers or characters pertaining to the opposite side. Other and further objects and advantages will be elucidated in the hereinafter following description of an embodiment of the present invention, or will be clear to those skilled in the art.

To the attainment of the above objects and advantages, the present invention consists in the novel measuring apparatus and the novel table, scale or chart herein illustrated or described, as well as the various described features of combination, arrangement and detail.

In the accompanying drawings forming part hereof, Figure 1 is a side elevation showing a suitable measuring apparatus, namely, an automatic weighing machine of usual commercial form and embodying the present invention.

Figure 11:
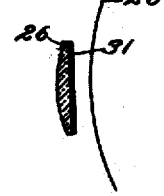
Figure 12:
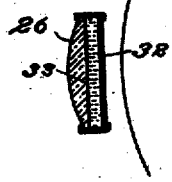
Figure 13:
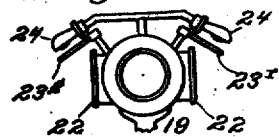

Figs. 11, 12 and 13 indicate modified embodiments of the invention adapted to give analogous results.

Figure 1:
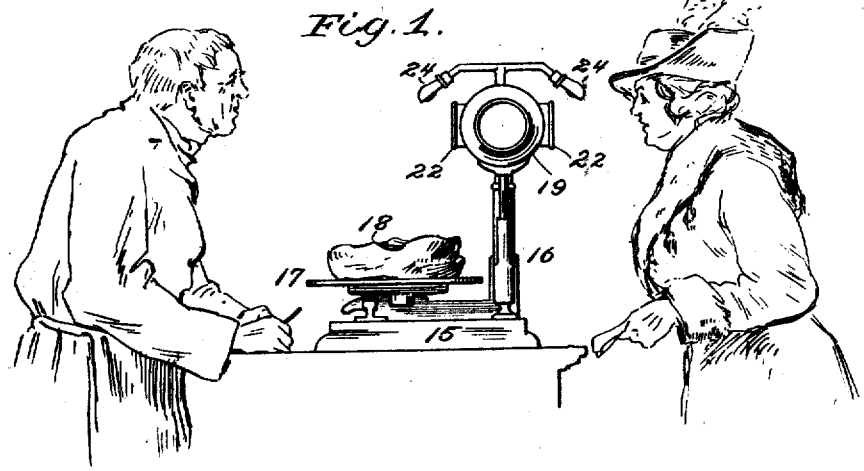

I will first describe some of the features of the particular type of measuring or weighing apparatus to which for illustration I have shown the present invention applied. Referring to Fig. 1, within the base 15 and standard 16 is located suitable weighing mechanism, the details of which *per se* form no part of the present invention. Above the base is the scale pan or platform 17, upon which is shown a commodity or article of merchandise 18, which is the subject of sale, and the weight and price of which is to be determined. At the top of the standard is a casing 19, containing the relatively movable and preferably rotary cylindrical chart 20, mounted preferably on a horizontal axis by any suitable fixtures. By this arrangement the cylindrical chart 20 bearing the inscriptions or numerals 21 is viewable from the two opposite sides of the sales counter by the customer and the salesman, respectively. At each side the casing 19 is provided with an opening surrounded by a hood or frame 22, which may contain a plate of glass 23, so that the tabular matter or scales can be easily seen. The scales may be inspected by the general illumination or daylight, or in some cases it is preferable to provide special lamps 24.

Figure 4:
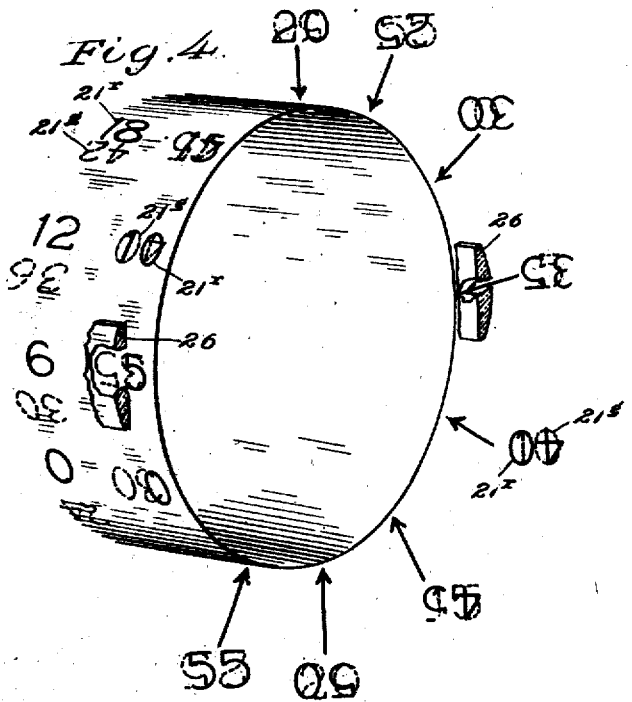
Fig. 4 is a diagrammatic perspective view of the cylindrical tabular chart, with many of the numerals or entries omitted and those that are shown exaggerated in size and arrangement. The first series of numbers in this diagram are indicated completely around the periphery of the chart at the points where they would not be seen in the perspective view, for the purposes of explanation.

Normally, when no article is on the scale pan, the rotating chart or cylinder 20 stands with each of its scales at zero, and as an index to judge the correct reading a distinctive horizontal or zero line 25 is suitably inscribed on the plate glass 23 or otherwise The operation in determining the price of a quantity of material placed in the scale pan may be as follows. The interior mechanism causes the rotation of the cylindrical chart 20 until it comes to balance at the proper adjustment. As shown in Fig. 4, this indicates a reading of 5, which means five cents if the scale system 21 is inscribed to indicate price. Along the length of the cylinder are a number of these tables or scales of prices, and one or the other of these is consulted according to the unit charge or price per pound of the commodity. For facilitating reading the chart it is convenient to employ at each side an elongated cylindrical lens 26 which extends the whole length of the chart and magnifies the numbers. Along the bottom of the frame is shown a fixed scale 27 of basic prices. The operation is to select on the price scale 27 the figure indicating the price per pound of the commodity, and by examining directly above this the magnified view of the proper scale is found, opposite to the index line 25, a reading which constitutes the total price of the commodity or article being sold.

Figure 2:
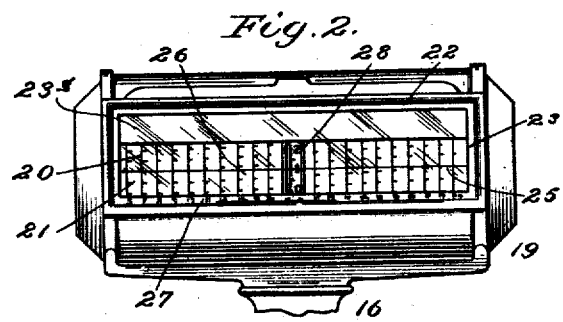
Fig. 2 is a left elevation of the upper part of the same, showing especially the casing and a part of the movable cylindrical chart contained therein.

It is obvious that the set of inscriptions seen by the salesman at the left and shown in Figs. 2 and 4 would upon a half-revolution of the cylinder stand in inverted position before the customer. This set of numbers, therefore, is not only inverted for the customer, but gives the wrong readings or results, so that the same is of no use at that side of the apparatus, but on the contrary a distinct detriment in the confusion it would tend to produce in reading a second and properly located set or system of numbers.

Figure 7:
Fig. 7 is an enlarged view of the inscription on the chart at the left side.
Figure 8:
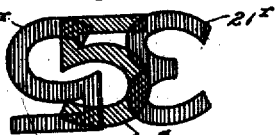
Fig. 8 is a similar view of the corresponding inscription observed by the person at the opposite or righthand side.
Figure 10:
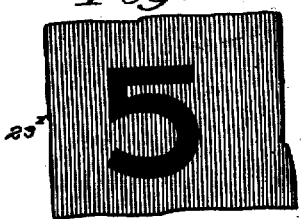

According to the present invention I inscribe upon the movable chart two superposed sets of inscriptions of optically dissimilar kinds, for example, of dissimilar or complementary colors. By superposed I mean that one set of inscriptions is printed or impressed upon the chart in proper position, arrangement and size without respect to the other set, and then the other set likewise printed over the same chart surface without respect to the first set. Sometimes the numbers or marking of one set may fall between those of the others, or sometimes directly one over the other, as seen in Figs. 4, 7 and 8. With such a chart in such a measuring apparatus I am enabled to combine a suitable correcting means such that one set or system of tables is apparent or visible from one point or side, and the other set from another point or the opposite side.

Such being the general characteristics of the present invention, I will now describe the preferred mode of embodying the same in practical form.

A convenient mode of providing the duplicate or superposed sets of readings or tables of optically dissimilar kinds is to print the system in two distinctive, opposite or complementary colors, and for the sake of illustration the colors red and green may be chosen, since they are practically complementary for the purposes of the present invention. In combination with such a two-color chart, this invention provides correcting means, preferably in the form of optical screens, which may consist simply of colored glasses corresponding with the selected colors red and green, and so arranged that the persons at the opposite sides will view the chart by light of the selected complementary colors, respectively.

Thus, referring to the perspective diagram Fig. 4, a set or system of numerals $21^r$ is shown in full lines, representing a red printing color, while in dotted lines representing green is a duplicate system of numerals $21^g$. The latter are, of course, relatively inverted, and are spaced away from the same numbers on the other system, namely, approximately 180° therefrom. If now, with this arrangement we can render the green numerals easily visible or apparent to the salesman at the left, while the red numerals are substantially invisible or non-apparent, and at the opposite side can render apparent the red numerals only, then without confusion or inconvenience the persons at the two sides will each perceive the same reading, namely 5, thus attaining the object of the present invention.

Figure 3:
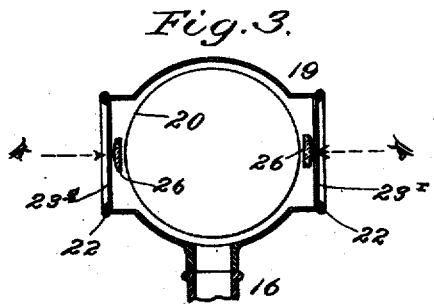
Fig. 3 is a diagrammatic central cross-section of the parts seen in Fig. 2.

To secure this result it is only necessary, according to this invention to provide that the salesman at the left shall view the chart with green light, and the customer at the right view it with red light; it being presupposed that the chart itself is printed on white paper or material. A simple manner in which to accomplish this is to employ a plate of green glass $23^g$ for the glass 23 at the left, and a plate of red glass $23^r$ for that at the right, within the respective hoods or frames 22, and as indicated by the reference numerals in Figs. 2 and 3. The effect of this is that whether daylight be used, or the special lamps 24, the observer at the left for example, is able to see the chart only by reflected light which has been twice transmitted through the medium, screen or glass plate 23ˢ. This apparently colors the white background of the chart to a green color, and the green printed numbers 21ˢ, being of an appropriate shade, blend and disappear so that the observer sees only the red system of numbers or scales; and the converse is true at the opposite side the customer, through the red glass, seeing only the green colored inscriptions of the chart.

Figure 5:
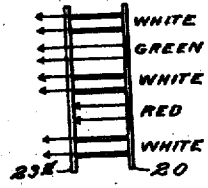
Figs. 5 and 6 are optical diagrams showing the action of the light and the effect of the medium or screen.
Figure 6:
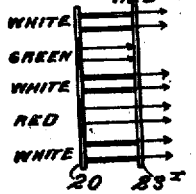

The optical principles of this result are made clear on Figs. 5 and 6. On Fig. 5 a portion of the chart 20 is shown, having white, green and red areas. In front stands the green color-screen 23ˢ. The action of a green glass is to shut off the transmission of rays of light other than green. Any white light, therefore, from the chart is converted into green as it passes through. The green light from the green areas passes through the screen without change, whereas the light from the red areas, having no green component, is wholly cut off at the glass plate. The observer, therefore, at the exterior sees only an even color everywhere, excepting for the red portions of the chart, which send no light to his eye, and therefore appear black. Analogously, Fig. 6 shows how the red portions of the chart blend with the background when seen through the red glass, whereas the green portions stand out as black lines.

Figure 9:
Fig. 9 shows how the inscription of Fig. 7 appears to the observer at the left by the use of the medium or screen at that side, and Fig. 10 correspondingly shows how the inscription of Fig. 8 appears to the observer at the right by the use of the medium at that side.

Figs. 7 to 10 illustrate these results on an enlarged scale. In Figs. 7 and 8 the vertically shaded lines indicate red color, and the slanted ones green color. Taking Fig. 7, for example, we have superposed numerals 5 upright and 35 inverted, the former red, the latter green. This is what the salesman would see at the left if there were no screen and he were able to see the chart by white light. The effect of employing the green screen 23ˢ, however, is, as shown in Fig. 9, to practically erase the green numeral 35, whereas by contrast the red numeral 5 stands out boldly in black. The more perfect and correct the colors selected for the printing and for the screens, the more perfect will be the result and inaccuracies will tend to introduce a slight indication of the undesired numeral, without, however, spoiling the desired effect. At the opposite or front side the purchaser would see, as in Fig. 8, the upright numeral 5 in green and the inverted numeral 35 in red, but being compelled to view this through a red screen, he only observes the numeral 5 standing out in black by contrast. Thus, both the salesman and the purchaser are advised that the price of the article is five.

It is convenient to provide not only the price table system 21 on the chart, but also a weight table 28, which for convenience may be printed in type of different size and located at the center as shown in Fig. 2.

Without my invention two of such weight scales, relatively inverted, might be placed side by side, but this would require at each side a mask to conceal the inverted one, thus involving an unsightly and unsymmetrical complication; which is wholly done away with by this invention, by which the duplicate inverted weight scales are printed one on top of the other in the opposite colors, red and green, dispensing with any mask, and also gaining considerable space and enabling additional price scales to be added to a chart of given length.

In lieu of printing first a green system on the chart, and then a red one, one might be separately printed on a separate transparent paper and wrapped about the other.

Instead of providing the colored glass plates 23ˢ and 23ʳ in the hoods 22, respectively, the same result may be accomplished in many other and equivalent ways. For example, as shown in Fig. 11, a layer 31 of the color red or green may be attached or coated on the lens, or the lens itself might be of glass of the proper color. Or, as in Fig. 12, a small liquid tank may be provided by means of a glass plate 32 spaced away from the lens with peripheral walls 33, the tank being filled with a liquid of the appropriate color. Anilin dyes constitute suitable colors, and a red and a green dye should be selected which are opposite or complementary in the sense that each substantially excludes the passage of light of the other color. In the Fig. 11 modification the chart may be printed with a red or green dye or ink of this kind, and the lens coated with a layer of the same material held in place by gelatin or other suitable vehicle. The liquid tank of Fig. 12 permits the anilin color to be increased or decreased in strength or depth to adjust it to the purposes of the invention.

Instead of placing a screen between the eye and the chart, a similar result may be obtained by brightly illuminating the chart by colored light. Thus, as in Fig. 13, the green screen 23ˢ is placed between the lamp 24 and the hood 22. In effect the white parts of the chart are thereby colored up to a green color sufficiently matching the green printed numbers to render them invisible, whereas the red printed numbers will stand out prominently as black. At the opposite side a red screen 23ʳ similarly placed will give analogous results; and in some cases the color screen at one side might be wholly omitted if the chart were printed vividly in one color and palely in the other color, so that at one side by ordinary light and at the other side by colored light the proper system or set of chart numerals would be relatively more apparent than the other.

It will thus be seen that I have described one form of measuring apparatus, namely, a weighing machine of a suitable type, the same embodying the principles and attaining the objects and advantages of the present invention, but since many described and illustrated matters of form, arrangement, combination, details and other features may be variously modified without departing from the underlying principles, it is not intended to limit the invention to such features excepting as specified in the appended claims.

What is claimed is:

1. An automatic weighing machine of the type having a rotatable cylindrical chart viewable from opposite sides, the same comprising said chart, the same printed with duplicate sets of tables by complementary colors, as red and green, in combination with optical screens in front of said chart at the two sides thereof, the same having colors corresponding respectively to said colors, whereby one set of tables is apparent to an observer at one side and the other set at the other side.

2. A measuring apparatus comprising measuring means, a chart inscribed with superposed sets of inscriptions of optically dissimilar kinds, the same viewable simultaneously from different viewpoints and mounted and connected so as to be shiftable by the action of the measuring means, in combination with an optical correcting means whereby one set of such inscriptions is predominantly apparent from one view point and another set from another view point.

3. A measuring apparatus comprising measuring means, a chart inscribed with superposed sets of inscriptions of optically dissimilar kinds, the same viewable simultaneously from different viewpoints and mounted and connected so as to be shiftable by the action of the measuring means, in combination with dissimilar optical screens located at different points such that one set of such inscriptions is predominantly apparent through one screen from one viewpoint and another set through another screen from another viewpoint.

4. In or for a measuring apparatus, a printed chart having a tabular set of inscriptions printed in one character or color, and superposed on the same a duplicate or corresponding tabular set of inscriptions printed in a dissimilar character or color and in a predetermined relation to the first set.

5. A weighing apparatus comprising a rotatable chart viewable from different sides and printed with two superposed systems of inscriptions of opposite colors, in combination with means whereby from the different sides the chart is viewed by light of different colors.

6. A weighing apparatus comprising a rotatable chart viewable from different sides and printed with two superposed systems of inscriptions of opposite colors, in combination with screens of corresponding colors at the two sides respectively.

7. A weighing apparatus comprising a rotatable chart viewable from different sides and printed with two superposed systems of inscriptions of opposite colors, in combination with an elongated lens and a color screen.

8. A weighing apparatus comprising a rotatable chart viewable from different sides and printed with two superposed systems of inscriptions of opposite colors, in combination with an elongated lens and a color screen, said screen consisting of a transparent tank containing dilute color material corresponding to one of those with which the chart is printed.

In testimony whereof, I have affixed my signature hereto.

CHRISTIAN BERGER.